(12) United States Patent
Lee et al.

(10) Patent No.: US 12,199,270 B2
(45) Date of Patent: Jan. 14, 2025

(54) POSITIVE ELECTRODE ACTIVE MATERIAL FOR LITHIUM RECHARGEABLE BATTERY, MANUFACTURING METHOD THEREFOR AND LITHIUM RECHARGEABLE BATTERY COMPRISING SAME

(71) Applicant: LG CHEM, LTD., Seoul (KR)

(72) Inventors: Cholong Lee, Daejeon (KR); Yun Kyoung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1019 days.

(21) Appl. No.: 17/265,275

(22) PCT Filed: Oct. 29, 2019

(86) PCT No.: PCT/KR2019/014328
§ 371 (c)(1),
(2) Date: Feb. 2, 2021

(87) PCT Pub. No.: WO2020/096253
PCT Pub. Date: May 14, 2020

(65) Prior Publication Data
US 2022/0115642 A1    Apr. 14, 2022

(30) Foreign Application Priority Data

Nov. 8, 2018 (KR) .......... 10-2018-0136482
Oct. 25, 2019 (KR) .......... 10-2019-0133909

(51) Int. Cl.
*H01M 4/36* (2006.01)
*H01M 4/133* (2010.01)
(Continued)

(52) U.S. Cl.
CPC .......... *H01M 4/364* (2013.01); *H01M 4/133* (2013.01); *H01M 4/136* (2013.01);
(Continued)

(58) Field of Classification Search
CPC .......... H01M 10/052; H01M 10/0525; H01M 2004/021; H01M 2004/028;
(Continued)

(56) References Cited

U.S. PATENT DOCUMENTS

| | | | |
|---|---|---|---|
| 2016/0036035 A1* | 2/2016 | Hayner | H01M 4/131 252/502 |
| 2017/0179477 A1 | 6/2017 | Walters et al. | |
| 2017/0352909 A1 | 12/2017 | Ainsworth et al. | |
| 2017/0358800 A1 | 12/2017 | Sun et al. | |
| 2018/0019465 A1 | 1/2018 | Kim et al. | |
| 2019/0372093 A1* | 12/2019 | Zhamu | H01M 4/364 |

FOREIGN PATENT DOCUMENTS

| | | |
|---|---|---|
| CN | 106207097 A | 12/2016 |
| CN | 104600265 B | 9/2017 |

(Continued)

OTHER PUBLICATIONS

Extended European Search Report for European Application No. 19881633.2, dated Jul. 7, 2021.
(Continued)

*Primary Examiner* — Lingwen R Zeng
(74) *Attorney, Agent, or Firm* — Birch, Stewart, Kolasch & Birch, LLP

(57) ABSTRACT

A positive electrode active material for a lithium secondary battery, which can improve the performance of the battery by mixing various carbons with positive electrode active material and applying it, and a preparation method thereof and a lithium secondary battery including the same. The positive electrode active material for the lithium secondary battery includes two or more types of active material composites in which sulfur is supported on the carbon materials contained therein, wherein the carbon materials contained in any one of the two or more types of active material composites differ in at least one of the average particle size and shape from the carbon materials contained in another type of active material composites.

13 Claims, 2 Drawing Sheets

(51) Int. Cl.
  H01M 4/136 (2010.01)
  H01M 4/1393 (2010.01)
  H01M 4/1397 (2010.01)
  H01M 4/58 (2010.01)
  H01M 4/587 (2010.01)
  H01M 10/0525 (2010.01)
  *H01M 4/02* (2006.01)
  *H01M 4/13* (2010.01)
  *H01M 4/38* (2006.01)
  *H01M 10/052* (2010.01)

(52) U.S. Cl.
  CPC ....... *H01M 4/1393* (2013.01); *H01M 4/1397* (2013.01); *H01M 4/366* (2013.01); *H01M 4/5815* (2013.01); *H01M 4/587* (2013.01); *H01M 10/0525* (2013.01); *H01M 2004/021* (2013.01); *H01M 2004/028* (2013.01); *H01M 4/13* (2013.01); *H01M 4/38* (2013.01); *H01M 10/052* (2013.01); *H01M 2220/20* (2013.01)

(58) Field of Classification Search
  CPC .... H01M 2220/20; H01M 4/13; H01M 4/133; H01M 4/136; H01M 4/1393; H01M 4/1397; H01M 4/364; H01M 4/366; H01M 4/38; H01M 4/5815; H01M 4/587; Y02E 60/10
  See application file for complete search history.

(56) References Cited

FOREIGN PATENT DOCUMENTS

| | | |
|---|---|---|
| CN | 107210421 A | 9/2017 |
| JP | 2017-515262 A | 6/2017 |
| JP | 2018-500741 A | 1/2018 |
| KR | 10-2015-0142832 A | 12/2015 |
| KR | 10-2016-0037084 A | 4/2016 |
| KR | 10-2016-0051610 A | 5/2016 |
| KR | 10-2017-0035817 A | 3/2017 |
| KR | 10-2017-0139761 A | 12/2017 |
| KR | 10-2018-0017975 A | 2/2018 |

OTHER PUBLICATIONS

Chen et al., "Flexible Carbon Nanotubes-Graphene/Sulfur Composite Film: Free-Standing Cathode for High-Performance Lithium/Sulfur Batteries", J. Phys. Chem. C, 2015, vol. 119, No. 19, 10288-10294, pp. 1-31.

International Search Report (PCT/ISA/210) issued in PCT/KR2019/014328 mailed on Feb. 10, 2020.

Zhang et al., "A High-Efficiency Sulfur/Carbon Composite Based on 3D Graphene Nanosheet@Carbon Nanotube Matrix as Cathode for Lithium-Sulfur Battery", Advanced Energy Materials, 2017, vol. 7, No. 11, 1602543, pp. 1-12.

* cited by examiner

[Figure 1]
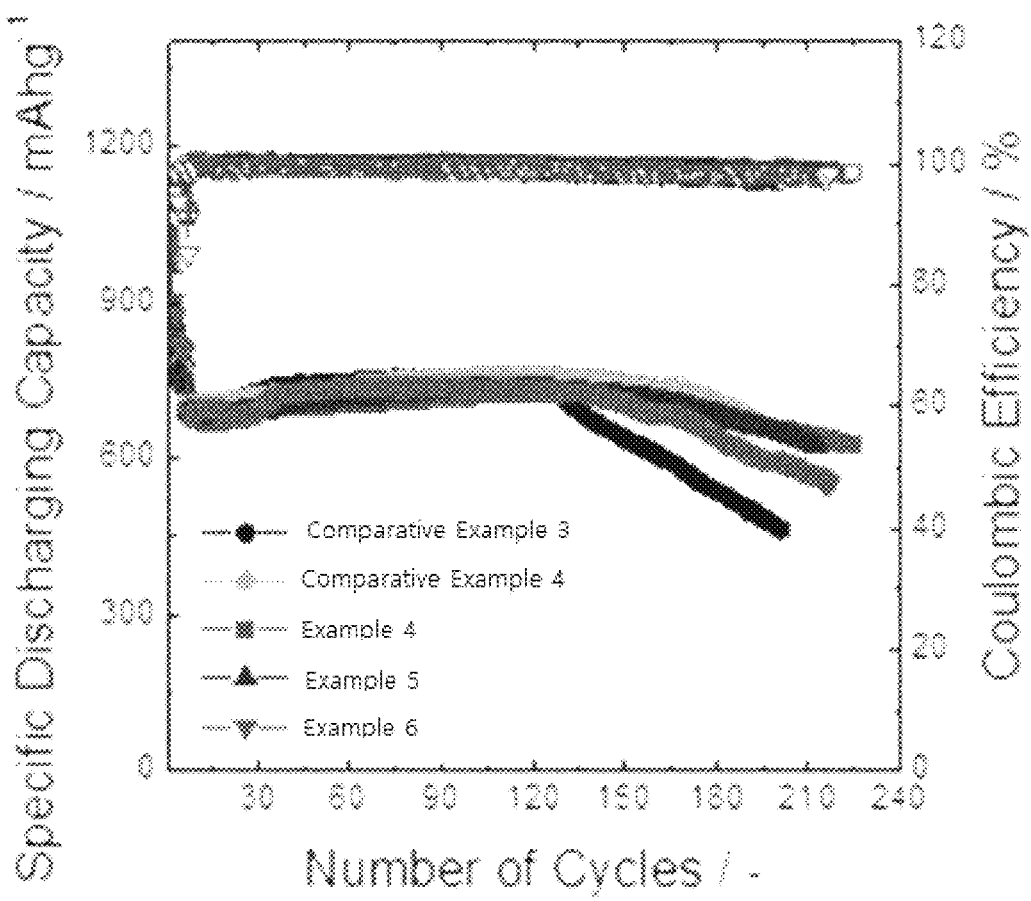

[Figure 2]
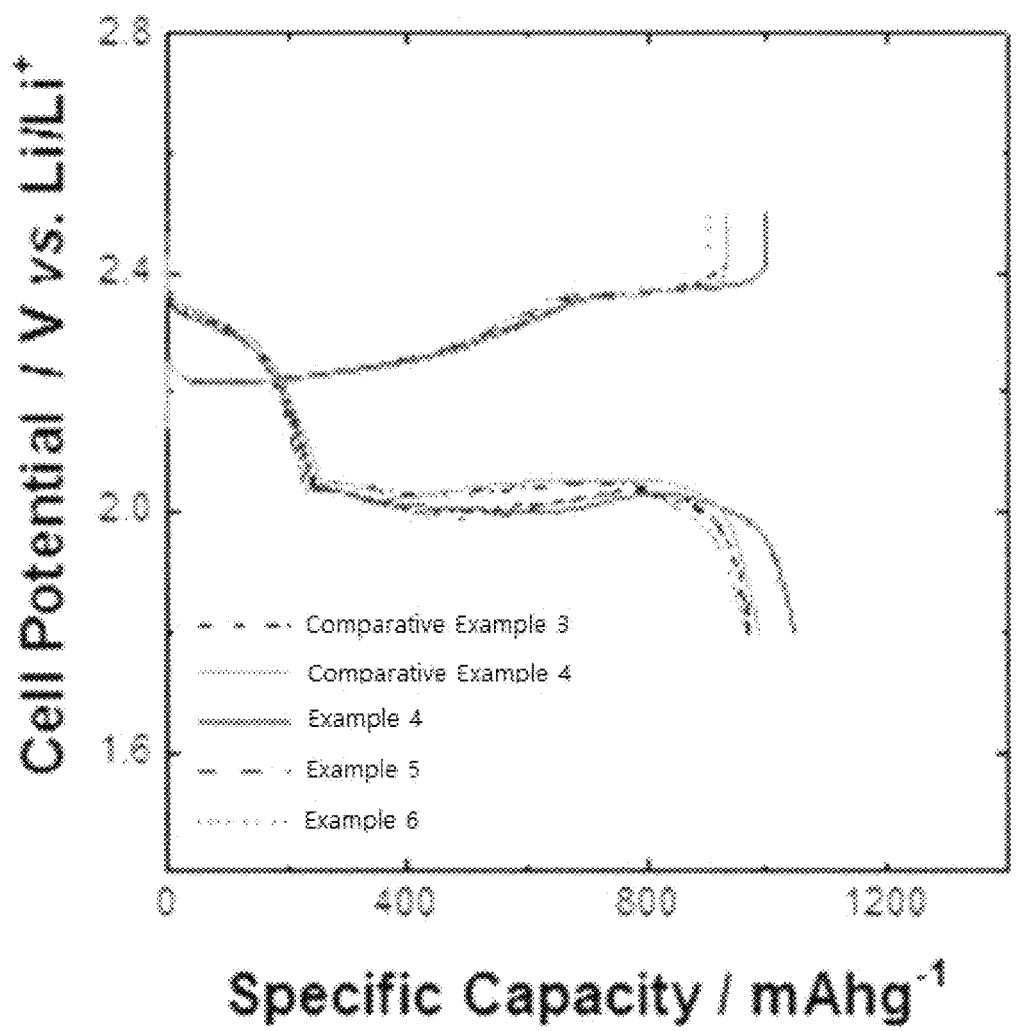

POSITIVE ELECTRODE ACTIVE MATERIAL FOR LITHIUM RECHARGEABLE BATTERY, MANUFACTURING METHOD THEREFOR AND LITHIUM RECHARGEABLE BATTERY COMPRISING SAME

TECHNICAL FIELD

This application claims the benefits of priorities based on Korean Patent Application No. 10-2018-0136482 filed on Nov. 8, 2018 and Korean Patent Application No. 10-2019-0133909 filed on Oct. 25, 2019, the entire contents of which are incorporated herein by reference.

The present invention relates to a positive electrode active material for a lithium secondary battery, a preparation method thereof and a lithium secondary battery comprising the same, more particularly, to a positive electrode active material for a lithium secondary battery, which can improve the performance of the battery by mixing various carbons with positive electrode active material and applying it, and a preparation method thereof, and a lithium secondary battery comprising the same.

BACKGROUND ART

As the interest in energy storage technology is increases, the field of application thereof has extended to the energy of mobile phones, tablets, laptops, and camcorders, and further to electric vehicles (EVs) and hybrid electric vehicles (HEVs), and thus the research and development of electrochemical devices for energy storage is steadily increasing. The electrochemical devices are the field that is receiving the most attention in this respect, and among them, the development of lithium-based secondary battery such as lithium-sulfur battery that is capable of charging/discharging has become a focus of attention. In recent years, in order to improve capacity density and specific energy in developing such a battery, research and development of new electrodes and batteries have been conducted.

A lithium-sulfur (Li—S) battery among these electrochemical devices, especially lithium secondary batteries, has high energy density, and thus is attracting attention as a next-generation secondary battery that can replace lithium ion batteries. In such a lithium-sulfur battery, a reduction reaction of sulfur and an oxidation reaction of lithium metal occur during discharging. At this time, sulfur forms linear lithium polysulfides ($Li_2S_2$, $Li_2S_4$, $Li_2S_6$, $Li_2S_8$) from $S_8$ of the ring structure. The lithium-sulfur battery has a characteristic of indicating a stepwise discharging voltage until the polysulfide (PS) is completely reduced to $Li_2S$.

In this lithium-sulfur battery, the sulfur positive electrode is non-conductive, and most of the positive electrode material is prepared by mixing sulfur, which contributes to the electrochemical reaction, with a conductive carbon-based material which is a carrier thereof. At this time, the reactivity of sulfur, high rate characteristic, lifetime characteristic and the like are affected depending on the carbonaceous material used. However, in the case of lithium-sulfur battery, since $Li_2S$ which is the final reaction product changes the electrode structure due to the increase in volume compared to S, and polysulfide which is the intermediate product is easily dissolved in the electrolyte, the polysulfide is continuously dissolved out during the discharging reaction, thereby reducing the amount of the positive electrode active material. As a result, the deterioration of the battery is accelerated and the reactivity and lifetime characteristics of the battery are inevitably reduced. In order to solve these problems, although technologies for modifying the surface of carbon have been developed, since there are difficulties in that a long and complicated process, such as heat treatment, must be involved, or the degree of reduction in leaching of polysulfide is insufficient, so far, there is no specific solution. Therefore, there is a need for a sulfur carrier capable of optimizing factors such as shape, size, and conductivity that affect the performance of the battery.

DISCLOSURE

Technical Problem

Accordingly, it is an object of the present invention to provide a positive electrode active material for a lithium secondary battery, which can improve the performance of the battery by mixing various carbons with positive electrode active material and applying it, a preparation method thereof, and a lithium secondary battery comprising the same.

Technical Solution

In order to achieve the above object, the present invention provides a positive electrode active material for a lithium secondary battery comprising two or more types of active material composites in which sulfur is supported on the carbon materials contained therein, wherein the carbon materials contained in any one of the two or more types of active material composites differ in at least one of the average particle size and shape from the carbon materials contained in another type of active material composites.

In addition, the present invention provides a method for preparing a positive electrode active material for a lithium secondary battery comprising the steps of (a) mixing and reacting each of two or more types of carbon materials having at least one of an average particle size and a shape different from each other with sulfur to prepare two or more types of active material composites in which sulfur is supported on each of the carbon materials contained therein; and (b) mixing the prepared two or more types of active material composites.

In addition, the present invention provides a lithium secondary battery comprising the above positive electrode comprising the positive electrode active material for the lithium secondary battery; a lithium-based negative electrode; an electrolyte interposed between the positive electrode and the negative electrode; and a separator.

Advantageous Effects

According to the positive electrode active material for the lithium secondary battery according to the present invention, the preparation method thereof, and the lithium secondary battery comprising the same, there is an advantage of improving the performance such as the lifetime characteristic of the battery by mixing and applying various carbons as positive electrode active materials.

DESCRIPTION OF DRAWINGS

FIG. 1 is a graph comparing and contrasting the lifetime characteristics of lithium-sulfur batteries according to the examples of the present invention and lithium-sulfur batteries according to the comparative examples.

FIG. 2 is a graph comparing and contrasting the charging profiles of lithium-sulfur batteries according to the examples of the present invention and lithium-sulfur batteries according to the comparative examples.

BEST MODE

Hereinafter, the present invention will be described in detail.

The positive electrode active material for the lithium secondary battery according to the present invention contains two or more types of active material composites in which sulfur is supported on the carbon materials contained therein, and is characterized in that the carbon materials contained in any one of the two or more types of active material composites differ in at least one of the average particle size and shape from the carbon materials contained in another type of active material composites.

The applicant of the present invention has improved the lifetime characteristic by using two or more types of carbon materials with different particle sizes and shapes as carbon materials which are applied as a sulfur carrier for a lithium secondary battery, especially for a lithium-sulfur battery, and thus applying the sulfur carrier mixed with the advantages expressed from each carbon material to the lithium secondary battery.

The active material composites are those in which sulfur is supported on the carbon materials contained therein, that is, which contain sulfur and carbon materials, and the active material composites may be used without limitation as long as they are classified into two or more types. For example, if two types of the active material composites are used, the first active material composite in which sulfur is supported on the first carbon material and the second active material composite in which sulfur is supported on the second carbon material are comprised. If three or more types of the active material composites are used, in addition to the first and second active material composites, the third active material composite may be further comprised. That is, in the present invention, the number of the active material composites is not particularly limited as long as the average particle size and shape of the carbon materials contained in each active material composite are different from each other.

Such active material composites can be mixed in various proportions as a positive electrode active material for a lithium secondary battery. For example, if two types of active material composites are used, the mixing ratio may be 1:9 to 9:1, and preferably, 2:8 to 8:2 as a weight ratio. In addition, if three or more types of active material composites are used, they may be applied at an appropriate mixing ratio within a range not departing from the spirit of the present invention.

The carbon materials contained in each of the active material composites are to improve conductivity, and may be used without particular limitation as long as they are a carbon material having conductivity and pores formed to support sulfur, such as carbon nanotubes (CNT), graphene, and graphene oxide (GO).

As described above, only when each carbon material contained in each active material composite is different from each other in at least one of average particle size and shape, the object of the present invention which is intended to improve the lifetime characteristic of a lithium secondary battery can be achieved. The average particle size of the carbon material is 2 to 200 µm, preferably 5 to 100 µm. If the average particle size of the carbon material is out of the range, a defective electrode coating is caused or a clogging phenomenon of the slurry may occur. If the particle size of each carbon material contained in each of the active material composites is not different from each other, the effect of improving the lifetime characteristic of the battery may be very small or absent.

That is, for example, if the positive electrode active material contains two types of active material composites, the carbon materials contained in any one type of active material composites of two types of active material composites may have an average particle size of 5 to 40 µm and the carbon materials contained in another type of active material composite may have an average particle size of 15 to 90 µm. As another example, if the positive electrode active material contains two types of active material composites, the carbon materials contained in any one type of active material composites of two types of active material composites may have an average particle size of 5 µm or more to no more than 25 µm and the carbon materials contained in another type of active material composites may have an average particle size of 25 µm or more to 90 µm or less.

Additionally, if the positive electrode active material contains two types of active material composites, the difference in average particle size between the carbon materials contained in any one type of active material composites of two types of active material composites and the carbon materials contained in another type of active material composites may be 5 to 65 µm, preferably 15 to 45 µm, more preferably 25 to 35 µm. If the difference in average particle size between the two carbon materials is less than 5 µm, there may be difficulties in maximizing the benefit from the difference in the average particle size. If the difference exceeds 65 µm, there may be no further substantial benefit.

In addition, if the positive electrode active material contains two types of active material composites, the weight ratio of the carbon materials having a relatively large average particle size contained in one type of active material composites among the two types of active material composites, and the carbon materials having a relatively small average particle size contained in another type of active material composites may be 1:1 to 4:1, preferably 2:1 to 4:1.

In the case of the shape of the carbon material, for example, if one is applied as carbon nanotubes, and the other is applied as other carbon materials such as graphene oxide, the shape of each carbon material may be different naturally. On the other hand, if homogeneous carbon materials are used and their particle sizes are also the same, only when the shapes between the carbon materials are necessarily different, the lifetime characteristic of the battery can be improved. In that case, referring to the shape of the carbon nanotubes (CNT) of the carbon materials, the shape of the CNT may typically be classified into an entangle type in which CNTs are entangled to form a spherical shape, and a bundle type in which CNTs are aligned in a predetermined direction to form a skein of elongated shape. The entangle type has advantages in terms of improvement of overvoltage or capacity expression, and comprises particles having an aspect ratio of 1 to 2. In addition, the bundle type is effective in improving high rate characteristics and decomposing reaction by-products, and comprises particles having an aspect ratio of more than 2. Therefore, it is desirable to configure each carbon material in each active material composite differently in shape from each other, so as to have all of these advantages.

Taken together, only when each carbon material contained in each of the active material composites has a different type from each other (in this case, the average particle size and shape between the carbon materials are naturally different), or in the case of the same type, one or more of the average particle size and shape between the carbon materials differs, it may be consistent with the intent of the present invention. Meanwhile, pores in which sulfur is supported are formed on the surface of the carbon material. In this case, the pore volume of the carbon material may be 0.5 to 5 cm$^3$/g.

Next, a method of preparing a positive electrode active material for a lithium secondary battery according to the present invention will be described. The method of preparing a positive electrode active material for a lithium secondary battery comprises the steps of (a) mixing and reacting each of two or more types of carbon materials having at least one of an average particle size and a shape different from each other with sulfur to prepare two or more types of active material composites in which sulfur is supported on each of the carbon materials and (b) mixing the prepared two or more types of active material composites.

In step (a), the active material composites comprise carbon materials in which at least one of their average particle size and shape is different from each other, and they can be prepared in two or more types. For example, when two types of active material composites are prepared, the first active material composite may be prepared by mixing and reacting sulfur and the first carbon material, and then the second active material composite may be prepared by mixing and reacting sulfur and the second carbon material. Each active material composite may be prepared at the same time depending on the process environment, and there is no particular limitation on the number of active material composites or the preparation order (However, the number of active material composites to be manufactured should be two or more). At this time, there is no particular limitation on the mixing ratio of sulfur and carbon material contained in each active material composite.

In step (a), the reaction may be carried out for 5 to 60 minutes, preferably 20 to 40 minutes at a temperature of 120 to 200° C., preferably 150 to 180° C. In addition, the definition of the carbon material or the description about the average particle size and shape thereof is as described above.

In the step (b), the prepared active material composites may be mixed in various ratios as a positive electrode active material for a lithium secondary battery. For example, if two types of active material composites are used, the mixing ratio may be 1:9 to 9:1, and preferably 2:8 to 8:2 as weight ratio. In addition, if 3 or more types of active material composites are used, they can be applied at an appropriate mixing ratio within the range without departing from the intent of the present invention. Meanwhile, the active material composites to be mixed in step (b) is preferably in the form of a slurry, but there is no particular limitation on the mixed form, as long as it does not depart from the scope of the present invention, and also the mixed forms commonly used in the art may be mutatis mutandis.

Finally, referring to the lithium secondary battery comprising the positive electrode active material for the lithium secondary battery, the lithium secondary battery comprises the above positive electrode comprising the positive electrode active material for the lithium secondary battery; a lithium-based negative electrode; an electrolyte interposed between the positive electrode and the negative electrode; and a separator.

In that case, the content of the positive electrode active material may be 50 to 95 parts by weight, preferably 60 to 90 parts by weight relative to 100 parts by weight of the positive electrode. If the content of the positive electrode active material is less than 50 parts by weight relative to the total weight of 100 parts by weight of the positive electrode, electrochemical characteristics of the battery by the positive electrode active material may be deteriorated. If the content of the positive electrode active material exceeds 95 parts by weight, additional components such as a binder and an electrically conductive material may be comprised in a small amount, thus making it difficult to manufacture an efficient battery. In addition, the lithium secondary battery according to the present invention may be a lithium-based secondary battery such as a lithium-sulfur battery, a lithium metal battery, and a lithium air battery, but the lithium-sulfur battery may best meet the intent of the present invention.

Meanwhile, the general configuration of the positive electrode except for the positive electrode active material, the negative electrode, the electrolyte, and the separator may be conventional ones used in the art, and a detailed description thereof will be described below.

The positive electrode included in the lithium secondary battery of the present invention further includes a binder and an electrically conductive material in addition to the above positive electrode active material. The binder is a component that assists in the adhesive strength between a positive electrode active material and an electrically conductive material and the bonding to a current collector, and for example, may be, but is not limited to, at least one selected from the group consisting of polyvinylidenefluoride (PVdF), polyvinylidenefluoride-polyhexafluoropropylene copolymer (PVdF/HFP), polyvinylacetate, polyvinylalcohol, polyvinylether, polyethylene, polyethyleneoxide, alkylated polyethyleneoxide, polypropylene, polymethyl(meth)acrylate, polyethyl(meth)acrylate, polytetrafluoroethylene (PTFE), polyvinylchloride, polyacrylonitrile, polyvinylpyridine, polyvinylpyrrolidone, styrene-butadiene rubber, acrylonitrile-butadiene rubber, ethylene-propylene-diene monomer (EPDM) rubber, sulfonated EPDM rubber, styrene-butylene rubber, fluorine rubber, carboxymethylcellulose (CMC), starch, hydroxypropyl cellulose, regenerated cellulose, and mixtures thereof.

The binder is usually added in an amount of 1 to 50 parts by weight, preferably 3 to 15 parts by weight, based on 100 parts by weight of the total weight of the positive electrode. If the content of the binder is less than 1 part by weight, the adhesive strength between the positive electrode active material and the current collector may be insufficient. If the content of the binder is more than 50 parts by weight, the adhesive strength is improved but the content of the positive electrode active material may be reduced, thereby lowering the capacity of the battery.

The electrically conductive material comprised in the positive electrode is not particularly limited as long as it does not cause side reactions in the internal environment of the battery and does not cause chemical changes in the battery but has excellent electrical conductivity. The electrically conductive material may typically be graphite or electrically conductive carbon, and may be, for example, but is not limited to, one selected from the group consisting of graphite such as natural graphite or artificial graphite; carbon black such as carbon black, acetylene black, Ketjen black, Denka black, thermal black, channel black, furnace black, lamp black; carbon-based materials whose crystal structure is graphene or graphite; electrically conductive fibers such as carbon fibers and metal fibers; carbon fluoride; metal powders such as aluminum and nickel powder; electrically conductive whiskers such as zinc oxide and potassium titanate; electrically conductive oxides such as titanium oxide; electrically conductive polymers such as polyphenylene derivatives; and a mixture of two or more thereof.

The electrically conductive material is typically added in an amount of 0.5 to 50 parts by weight, preferably 1 to 30 parts by weight based on 100 parts by weight of total weight of the positive electrode. If the content of electrically conductive material is too low, that is, if it is less than 0.5 parts by weight, it is difficult to obtain an effect on the improvement of the electrical conductivity, or the electrochemical characteristics of the battery may be deteriorated. If the content of the electrically conductive material exceeds 50 parts by weight, that is, if it is too much, the amount of positive electrode active material is relatively small and thus capacity and energy density may be lowered. The method of incorporating the electrically conductive material into the positive electrode is not particularly limited, and conventional methods known in the related art such as coating on the positive electrode active material can be used. Also, if necessary, the addition of the second coating layer with electrical conductivity to the positive electrode active material may replace the addition of the electrically conductive material as described above.

In addition, a filler may be selectively added to the positive electrode of the present invention as a component for inhibiting the expansion of the positive electrode. Such a filler is not particularly limited as long as it can inhibit the expansion of the electrode without causing chemical changes in the battery, and examples thereof may comprise olefinic polymers such as polyethylene and polypropylene; fibrous materials such as glass fibers and carbon fibers.

The positive electrode active material, the binder, the electrically conductive material and the like are dispersed and mixed in a dispersion medium (solvent) to form a slurry, and the slurry can be applied onto the positive electrode current collector, followed by drying and rolling it to prepare a positive electrode of the present invention. The dispersion medium may be, but is not limited to, N-methyl-2-pyrrolidone (NMP), dimethyl formamide (DMF), dimethyl sulfoxide (DMSO), ethanol, isopropanol, water, or a mixture thereof.

The positive electrode current collector may be, but is not limited to, platinum (Pt), gold (Au), palladium (Pd), iridium (Ir), silver (Ag), ruthenium (Ru), nickel (Ni), stainless steel (STS), aluminum (Al), molybdenum (Mo), chromium (Cr), carbon (C), titanium (Ti), tungsten (W), ITO (In doped $SnO_2$), FTO (F doped $SnO_2$), or an alloy thereof, or aluminum (Al) or stainless steel whose surface is treated with carbon (C), nickel (Ni), titanium (Ti) or silver (Ag) or so on. The shape of the positive electrode current collector may be in the form of a foil, film, sheet, punched form, porous body, foam or the like.

The negative electrode may be manufactured according to a conventional method known in the art. For example, the negative electrode active material, the electrically conductive material, the binder, and if required the filler and the like are dispersed and mixed in a dispersion medium (solvent) to form a slurry, and the slurry can be applied onto the negative electrode current collector, followed by drying and rolling it to prepare a negative electrode. The negative electrode active material may be a lithium metal or a lithium alloy (for example, an alloy of lithium and a metal such as aluminum, zinc, bismuth, cadmium, antimony, silicon, lead, tin, gallium or indium). The negative electrode current collector may be, but is not limited to, platinum (Pt), gold (Au), palladium (Pd), iridium (Ir), silver (Ag), ruthenium (Ru), nickel (Ni), stainless steel (STS), copper (Cu), molybdenum (Mo), chromium (Cr), carbon (C), titanium (Ti), tungsten (W), ITO (In doped $SnO_2$), FTO (F doped $SnO_2$), or an alloy thereof, or copper (Cu) or stainless steel whose surface was treated with carbon (C), nickel (Ni), titanium (Ti) or silver (Ag) or so on. The shape of the negative electrode current collector may be in the form of a foil, film, sheet, punched form, porous body, foam or the like.

The separator is interposed between the positive electrode and the negative electrode and prevents a short circuit therebetween and serves as a pathway for lithium ions. Olefin-based polymers such as polyethylene and polypropylene, glass fibers or the like may be used in the form of sheets, multilayers, microporous films, woven fabrics, non-woven fabrics or the like as the separator, but the present invention is not limited thereto. Meanwhile, if a solid electrolyte (e.g., an organic solid electrolyte, an inorganic solid electrolyte, etc.) such as a polymer is used as the electrolyte, the solid electrolyte may also serve as a separator. Specifically, an insulating thin film with high ion permeability and mechanical strength is used. The pore diameter of the separator is generally in the range of 0.01 to 10 μm, and the thickness may generally be in the range of 5 to 300 μm.

As the electrolyte or the electrolyte solution which is a non-aqueous electrolyte solution (non-aqueous organic solvent), carbonate, ester, ether, or ketone may be used alone or in combination of two or more thereof, but is not limited thereto. For example, an aprotic organic solvent, such as dimethyl carbonate, diethyl carbonate, dipropyl carbonate, methyl propyl carbonate, ethyl propyl carbonate, methyl ethyl carbonate, ethylene carbonate, propylene carbonate, butylene carbonate, y-butyrolactone, n-methyl acetate, n-ethyl acetate, n-propyl acetate, phosphoric acid triester, dibutyl ether, N-methyl-2-pyrrolidinone, 1,2-dimethoxyethane, tetrahydrofuran, tetrahydrofuran derivatives such as 2-methyltetrahydrofuran, dimethyl sulfoxide, formamide, dimethylformamide, dioxolane and derivatives thereof, acetonitrile, nitromethane, methyl formate, methyl acetate, trimethoxymethane, sulfolane, methyl sulfolane, 1,3-dimethyl-2-imidazolidinone, methyl propionate, ethyl propionate and the like can be used, but is not limited thereto.

Lithium salts may be added to the electrolyte solution (so-called non-aqueous electrolyte solution containing lithium salt). The lithium salts may comprise, but not limited to, those known to be favorably soluble in non-aqueous electrolyte solutions, for example, LiCl, LiBr, LiI, $LiClO_4$, $LiBF_4$, LiBioClio, $LiPF_6$, $LiCF_3SO_3$, $LiCF_3CO_2$, $LiAsF_6$, $LiSbF_6$, $LiPF_3(CF_2CF_3)_3$, $LiAlCl_4$, $CH_3SO_3Li$, $(CF_3SO_2)_2$ NLi, lithium chloroborane, lithium lower aliphatic carboxylate, lithium tetraphenyl borate, or lithium imide, etc. The (non-aqueous) electrolyte solution may further comprise pyridine, triethylphosphite, triethanolamine, cyclic ether, ethylene diamine, n-glyme-based compound, hexamethylphosphoric triamide, nitrobenzene derivatives, sulfur, quinoneimine dyes, N-substituted oxazolidinone, N,N-substituted imidazolidine, ethylene glycol dialkyl ether, ammonium salt, pyrrole, 2-methoxy ethanol, aluminum trichloride or the like, for the purpose of improving charging-discharging characteristics, flame retardancy, and the like. If necessary, halogen-containing solvents such as carbon tetrachloride and ethylene trifluoride may be further added to impart nonflammability, and carbon dioxide gas may be further added to improve the high-temperature conservation characteristic.

Meanwhile, the lithium secondary battery of the present invention can be manufactured by a conventional method in the art. For example, the lithium secondary battery can be manufactured by inserting the porous separator between the positive electrode and the negative electrode, and introducing the non-aqueous electrolyte solution. The lithium secondary battery according to the present invention is not only applicable to a battery cell such as a coin cell used as a power source of a small device but also particularly suitably usable as a unit cell of a battery module which is a power source of a medium and large-sized device. In this respect, the present invention also provides a battery module in which at least two lithium secondary batteries are electrically connected (in series or in parallel). It is needless to say that the number of lithium secondary batteries comprised in the battery module may be variously adjusted in consideration of the use and capacity of the battery module.

In addition, the present invention provides a battery pack in which the battery modules are electrically connected according to a conventional technique in the art. The battery module and the battery pack may be used as a power source for at least one medium and large-sized device selected from power tools; electric cars comprising an electric vehicle (EV), a hybrid electric vehicle (HEV), and a plug-in hybrid electric vehicle (PHEV); electric trucks; electric commercial vehicles; or power storage systems, but the present invention is not limited thereto.

Hereinafter, preferred examples are presented in order to facilitate understanding of the present invention. However, it will be apparent to those skilled in the art that these examples are merely illustrative of the invention, various changes and modifications can be made within the scope and spirit of the invention, and such changes and modifications are intended to fall within the scope of the appended claims.

[Example 1] Preparation of Positive Electrode Active Material

First, sulfur and carbon nanotubes having an entangled shape with an average particle size of 57.27 μm were mixed at a weight ratio of 7.5:2.5, and then reacted at 155° C. for 30 minutes to prepare a first active material composite. In addition, sulfur and carbon nanotubes having a bundle shape with an average particle size of 22.59 μm were mixed at a weight ratio of 7.5:2.5, and reacted at 155° C. for 30 minutes to prepare a second active material composite. Subsequently, the first active material composite and the second active material composite prepared above were, when preparing a slurry, stirred and mixed at a weight ratio of 8:2 at a speed of 1,500 rpm, thereby preparing a positive electrode active material.

[Example 2] Preparation of Positive Electrode Active Material

A positive electrode active material was prepared in the same manner as in Example 1, except that the first active material composite and the second active material composite were mixed at a weight ratio of 5:5 instead of 8:2.

[Example 3] Preparation of Positive Electrode Active Material

A positive electrode active material was prepared in the same manner as in Example 1, except that the first active material composite and the second active material composite were mixed at a weight ratio of 2:8 instead of 8:2.

[Comparative Example 1] Preparation of Positive Electrode Active Material

Sulfur and carbon nanotubes having an entangled shape with an average particle size of 57.27 μm were mixed at a weight ratio of 7.5:2.5, and reacted for 30 minutes at 155° C. to prepare a positive electrode active material (that is, corresponding to the first active material composite in Example 1).

[Comparative Example 2] Preparation of Positive Electrode Active Material

Sulfur and carbon nanotubes having a bundle shape with an average particle size of 22.59 μm were mixed at a weight ratio of 7.5:2.5, and reacted for 30 minutes at 155° C. to prepare a positive electrode active material (that is, corresponding to the second active material composite in Example 1).

[Examples 4-6 and Comparative Examples 3-4] Manufacture of Lithium-Sulfur Battery Preparation Positive Electrode for Lithium-Sulfur Battery The positive electrode active material prepared in Examples 1 to 3, Comparative Examples 1 and 2, respectively, super-P as an electrically conductive material and polyvinylidene fluoride (PVdF) as a binder were mixed at a weight ratio of 88:5:7, dispersed in an NMP solvent to prepare a slurry, and then the slurry coated on an aluminum current collector (Al foil) to a thickness of 500 μm, and dried in a vacuum oven at 120° C. for 13 hours to prepare a positive electrode for a lithium-sulfur battery.

Manufacture of Lithium-Sulfur Battery

The prepared positive electrode was positioned to face a negative electrode (Li metal foil), and then interposed a polyethylene separator therebetween, and then an electrolyte solution in which LiFSI was dissolved at a concentration of 4 M in a dimethyl ether solvent to prepare a lithium-sulfur battery.

[Experimental Example 1] Evaluation of Lifetime Characteristic of Battery

The remaining capacity of the lithium-sulfur batteries prepared in Examples 4 to 6 and Comparative Examples 3 and 4 according to repeated charging and discharging was confirmed to evaluate lifetime characteristic of each lithium-sulfur battery. FIG. 1 is a graph comparing and contrasting the lifetime characteristics of lithium-sulfur batteries according to the examples of the present invention and lithium-sulfur batteries according to the comparative examples. FIG. 2 is a graph comparing and contrasting the charging profiles of lithium-sulfur batteries according to the examples of the present invention and lithium-sulfur batteries according to the comparative examples.

As shown in FIGS. 1 and 2, it was confirmed that the lithium-sulfur batteries (Examples 4 to 6) in which two or more types of active material composites are applied together as a positive electrode active material according to the present invention have improved lifetime characteristics compared to conventional lithium-sulfur batteries (Comparative Examples 3 and 4) in which a single active material composite is applied as a positive electrode active material. In particular, as can be seen from FIG. 2, it was found that the battery prepared in Example 4 has an increased initial discharge capacity compared to the batteries prepared in Comparative Examples 3 and 4. Through this, it can be seen that if a variety of carbon materials are mixed at an appropriate ratio and applied as a sulfur carrier as in the present invention, the performance of the battery such as lifetime characteristic is excellent.

The invention claimed is:

1. A positive electrode active material for a lithium secondary battery comprising:
   a first active material composite comprising a first carbon material and sulfur supported on the first carbon material;
   a second active material composite comprising a second carbon material and sulfur supported on the second carbon material, and
   a third active material composite comprising a third carbon material and sulfur supported on the third carbon material,
   wherein the first carbon material, the second carbon material, and the third carbon material differ from each other in at least one of average particle size and shape.

2. The positive electrode active material for the lithium secondary battery according to claim 1, wherein the first active material composite and the second active material composite are present in a weight ratio of 1:9 to 9:1.

3. The positive electrode active material for the lithium secondary battery according to claim 1, wherein the average particle size of the first and second carbon material is independently 2 μm to 200 μm.

4. The positive electrode active material for the lithium secondary battery according to claim 2, wherein the first carbon material has an average particle size of 5 μm to 40 μm and the second carbon material has an average particle size of 15 μm to 90 μm.

5. The positive electrode active material for the lithium secondary battery according to claim 2, wherein the first carbon material has an average particle size of 5 μm or more to no more than 25 μm and the second carbon material has an average particle size of 25 μm or more to 90 μm or less.

6. The positive electrode active material for the lithium secondary battery according to claim 2, wherein a difference in an average particle size between the first carbon material and the second carbon material is 5 μm to 65 μm.

7. The positive electrode active material for the lithium secondary battery according to claim 1, wherein the first and second carbon material is independently selected from the group consisting of carbon nanotubes, graphene and graphene oxide.

8. The positive electrode active material for the lithium secondary battery according to claim 7, wherein the first and second carbon material is carbon nanotube, and its shape is an entangle type or bundle type.

9. The positive electrode active material for the lithium secondary battery according to claim 8, wherein the carbon nanotubes having the entangle type comprise particles having an aspect ratio of 1 to 2, and the carbon nanotubes having the bundle type comprise particles having an aspect ratio of greater than 2.

10. A method for preparing a positive electrode active material for a lithium secondary battery comprising the steps of:
    (a) mixing and reacting a first carbon material and a second carbon material with sulfur to prepare a first active material composite comprising the first carbon material with sulfur supported thereon and a second active material composite comprising the second carbon material with sulfur supported thereon, wherein the first carbon material and the second carbon material differ from each other in at least one of an average particle size and shape; and
    (b) mixing the prepared first and second active material composites, and further wherein the reaction is carried out for 5 minutes to 60 minutes at a temperature of 120° C. to 200° C.

11. The method for preparing the positive electrode active material for the lithium secondary battery according to claim 10, wherein the first and second active material composites are mixed in a weight ratio of 1:9 to 9:1.

12. A lithium secondary battery comprising: the positive electrode comprising the positive electrode active material for the lithium secondary battery of claim 1; a lithium-based negative electrode; an electrolyte interposed between the positive electrode and the negative electrode; and a separator.

13. The lithium secondary battery according to claim 12, wherein the lithium secondary battery is a lithium-sulfur battery.

* * * * *